Nov. 17, 1964    I. B. IVERSON    3,157,355
SYNCHRONOUS HARMONIC COMPUTER
Filed July 3, 1961    9 Sheets-Sheet 1

Iver B. Iverson
INVENTOR.

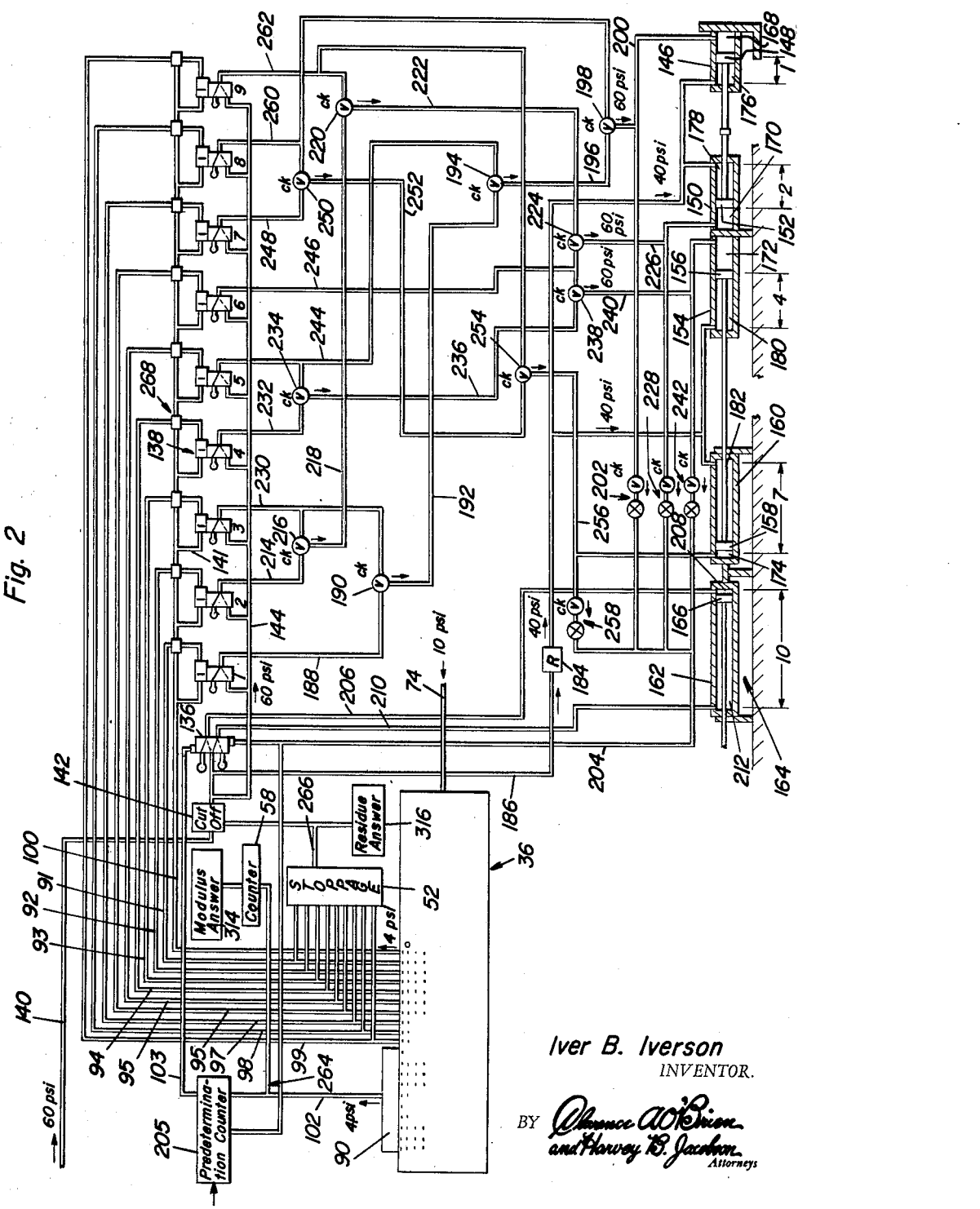

Nov. 17, 1964
I. B. IVERSON
3,157,355
SYNCHRONOUS HARMONIC COMPUTER
Filed July 3, 1961
9 Sheets-Sheet 3
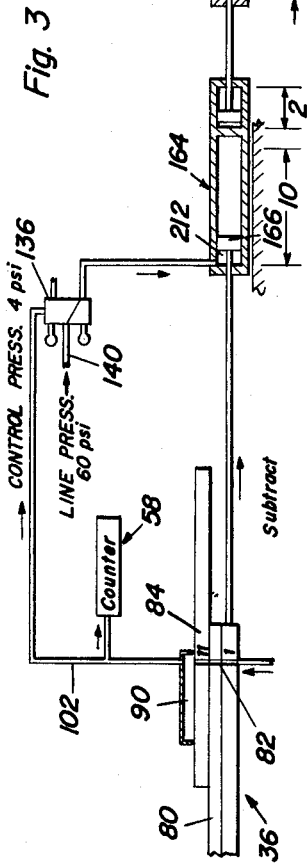
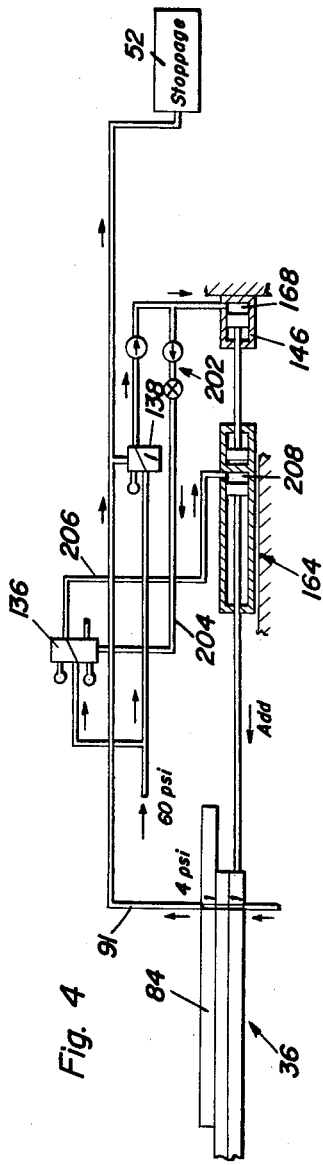
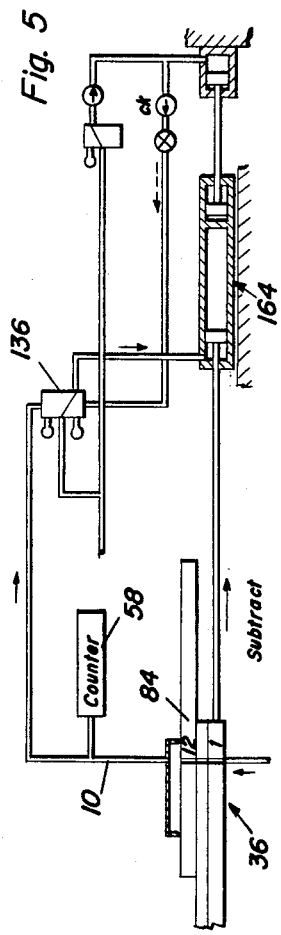
Iver B. Iverson
INVENTOR.
BY
Attorneys Nov. 17, 1964      I. B. IVERSON      3,157,355
SYNCHRONOUS HARMONIC COMPUTER
Filed July 3, 1961      9 Sheets-Sheet 4

Iver B. Iverson
INVENTOR.

BY *Clarence A. O'Brien*
*and Harvey B. Jacobson*
Attorneys

Nov. 17, 1964  I. B. IVERSON  3,157,355
SYNCHRONOUS HARMONIC COMPUTER
Filed July 3, 1961  9 Sheets-Sheet 5
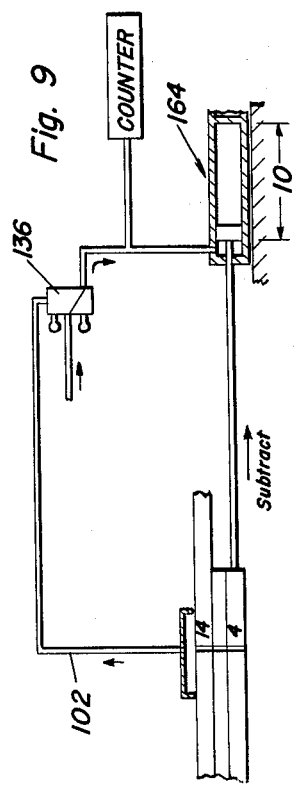
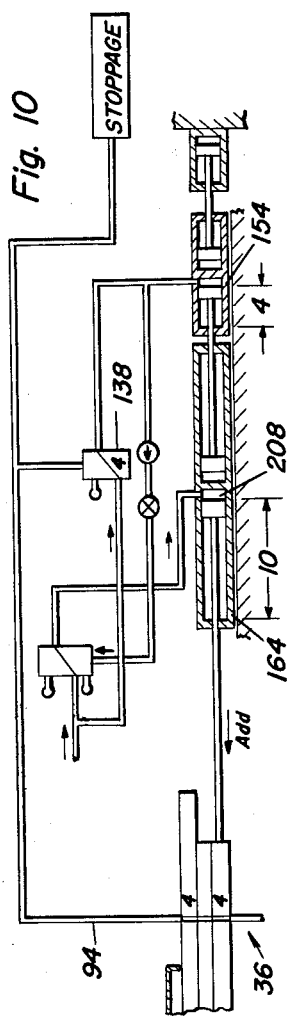
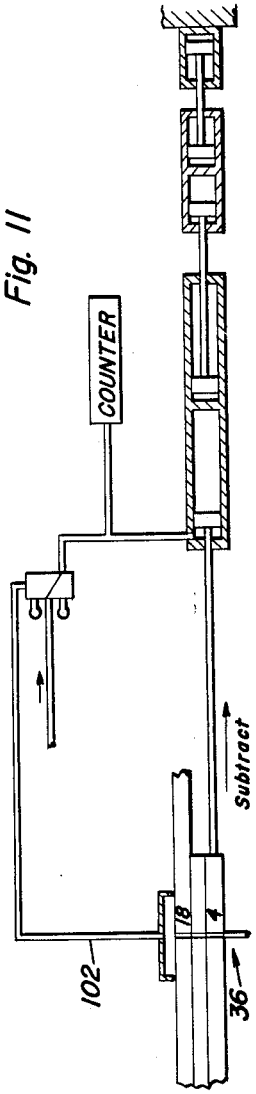
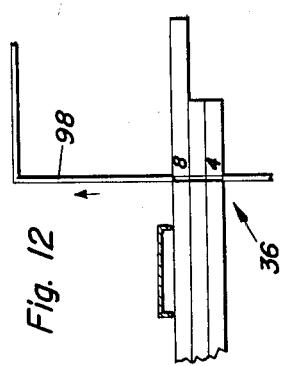
Iver B. Iverson
INVENTOR.

Nov. 17, 1964
I. B. IVERSON
3,157,355
SYNCHRONOUS HARMONIC COMPUTER
Filed July 3, 1961
9 Sheets-Sheet 6
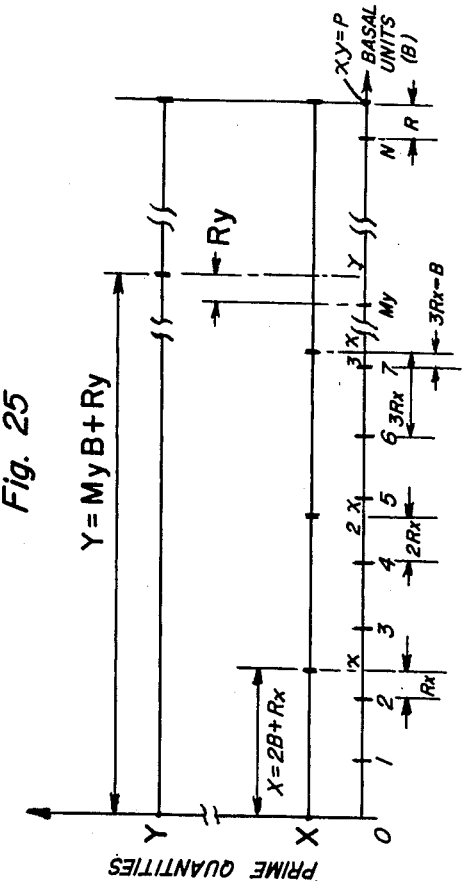
Fig. 24
Fig. 25
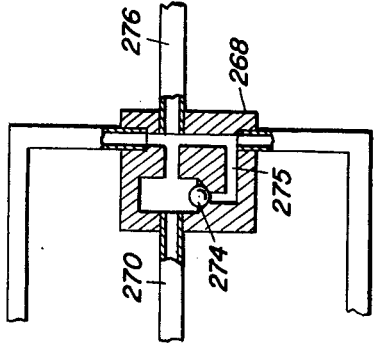
Fig. 13
Iver B. Iverson
INVENTOR.

Nov. 17, 1964     I. B. IVERSON     3,157,355
SYNCHRONOUS HARMONIC COMPUTER
Filed July 3, 1961     9 Sheets-Sheet 7
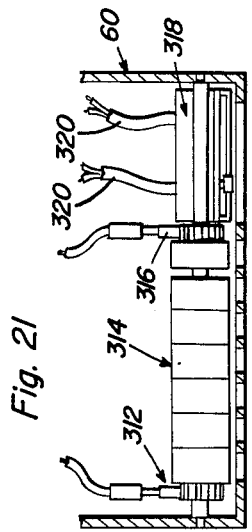
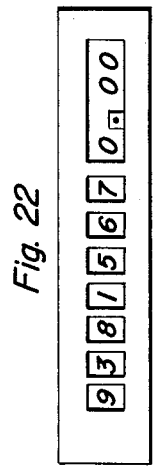
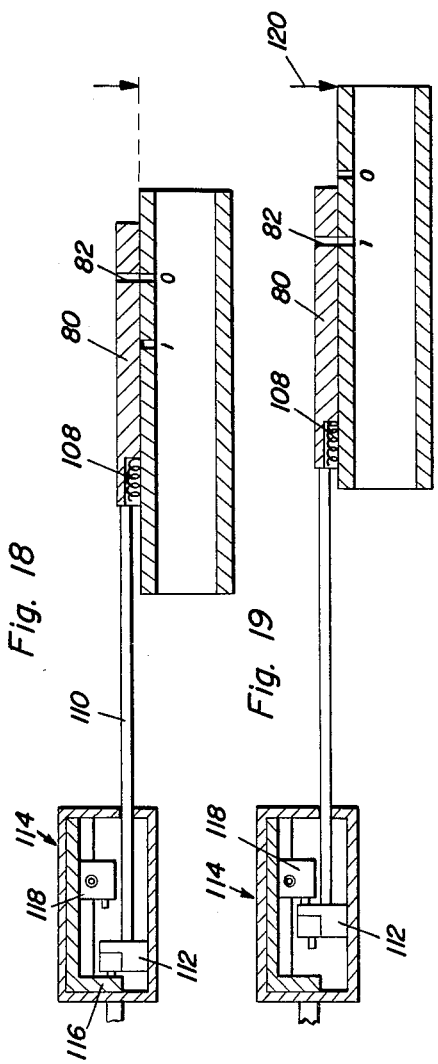
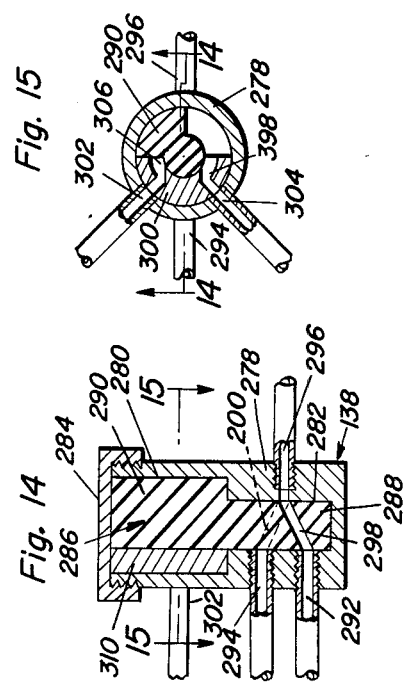
Iver B. Iverson
INVENTOR.

Nov. 17, 1964     I. B. IVERSON     3,157,355
SYNCHRONOUS HARMONIC COMPUTER
Filed July 3, 1961     9 Sheets-Sheet 8
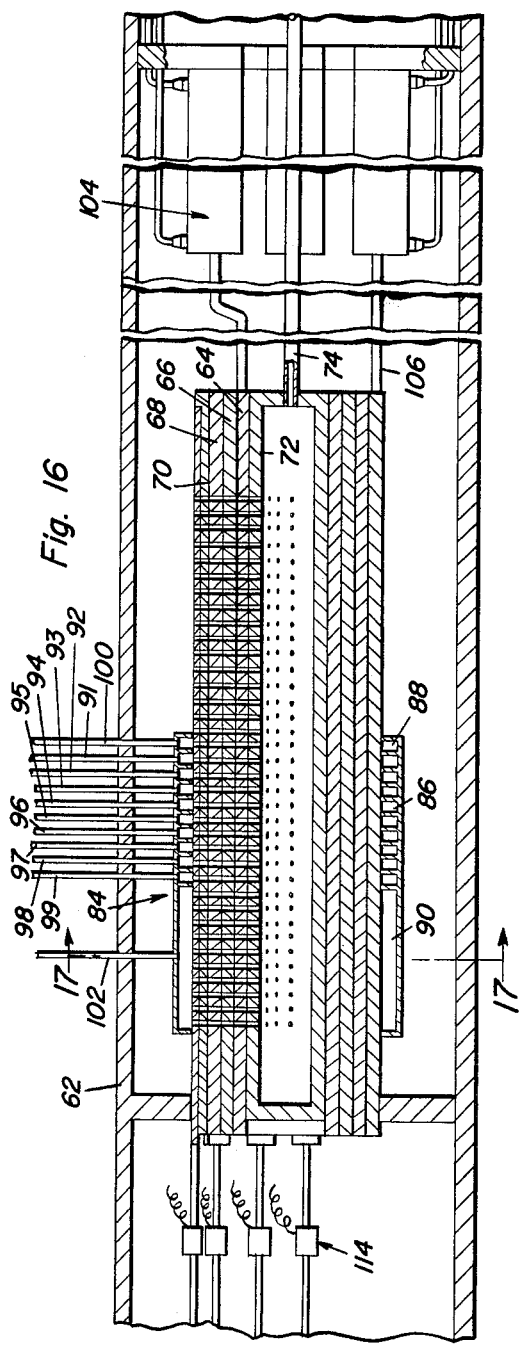
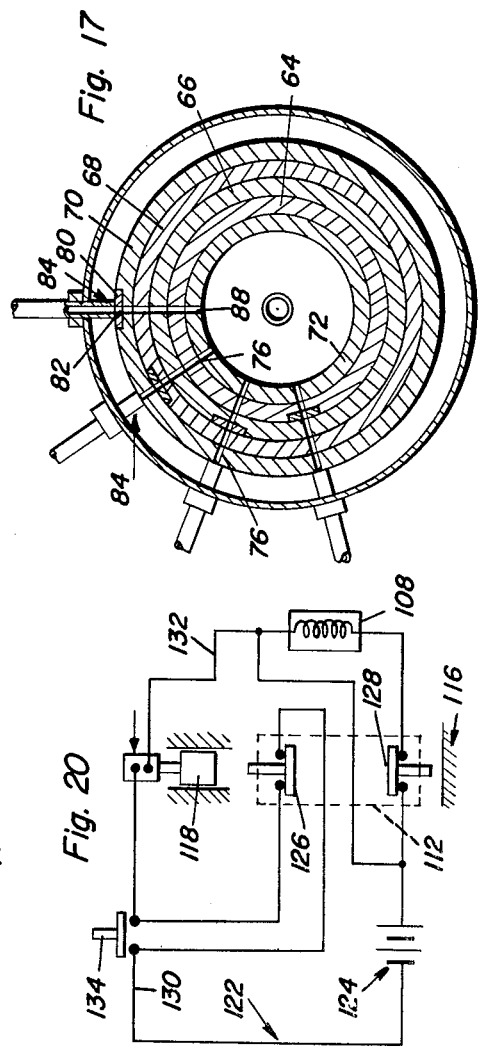
Iver B. Iverson
INVENTOR.
BY Clarence A. O'Brien
and Harvey B. Jacobson
Attorneys

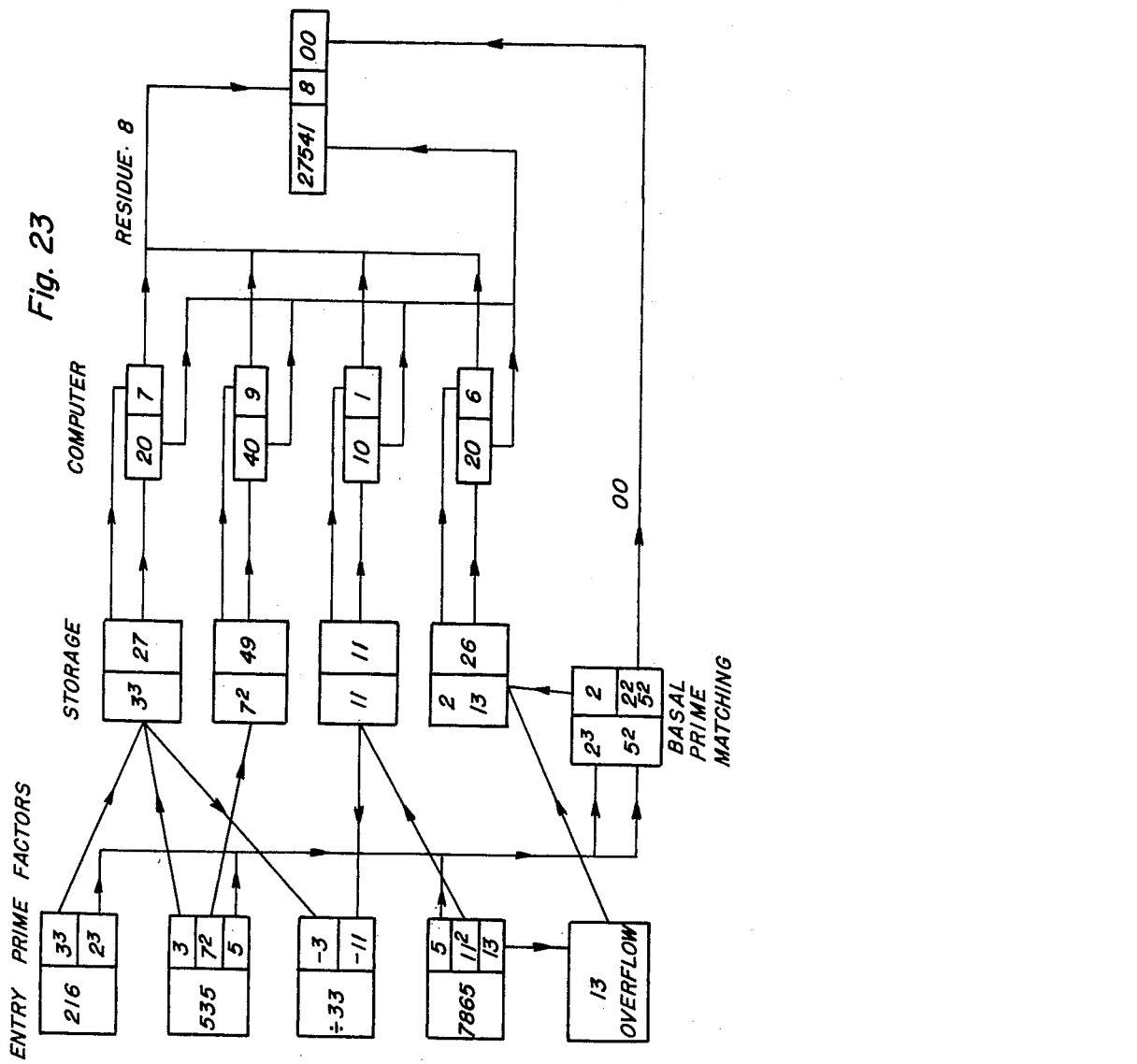

United States Patent Office 3,157,355
Patented Nov. 17, 1964

3,157,355
SYNCHRONOUS HARMONIC COMPUTER
Iver B. Iverson, P.O. Box 244, Valdez, Alaska
Filed July 3, 1961, Ser. No. 121,646
19 Claims. (Cl. 235—201)

This invention relates to a novel and useful system for computation particularly adaptable for automatic computer operations whereby exact solutions to problems if existent, may be obtained upon cessation of the automatic operation occurring when numbers originating from the problem entries have been matched.

The computation system of the present invention is based upon the discovery that different repeating series of numbers representing different entry quantities, will all coincide at some point in all of the respective series and that the number of terms of the series at which coincidence occurs and the common term in the series at which such coincidence occurs will represent the answer to the problem presented by the entries which program the computer to automatically perform a plurality of simultaneous operations representing the aforementioned repeating series corresponding to each of the entries with the operation of the computer stopping when matching occurs between all of the series terms. The computer by counting the number of operations before coincidence or matching occurs and registering the common term of each of the series, issues a correct and exact answer.

Another object of this invention is to provide a novel computation system and computer which will perform in a more rapid manner between entry and solution for certain problems than would be possible with computation systems heretofore used and may also solve problems which were inherently incapable of exact solutions by computers heretofore employed.

Because of the novel system of computation as will be hereafter explained, many mathematical relationships can be represented and more readily applied for solution of problems heretofore defying solution. The novel system of computation inherent in the computer of the present invention will therefore, be of considerable interest and value in connection with problems involving harmonic relationships and wave theories. Accordingly, the computer of the present invention will be useful in connection with fields of study involving cyclical relationships and will in particular be useful in connection with scientific research in optics, electron movement, crystal structure, astronomy, etc.

In accordance with the foregoing objects, the present invention contemplates the application of the novel computation system to an automatically operative mechanism associated with an input component and an answer compilation component for properly conditioning the problem to be operated upon in accordance with the novel computation system and for obtaining the results thereof properly compiled to indicate the correct and exact answer to the entry problem. The novel computation system involves a complete departure from computation procedures heretofore practiced and is based upon the discovery or recognition that the product of a plurality of factors may be reflected by their relationships to number series originating with the respective factors, where the number series are of a cyclic nature. Accordingly, by representing one portion of each entry factor by its characteristic number series and properly establishing the phase relationships between the number series in accordance with the other portion of the entry, the answer may be obtained when matching occurs between all of the terms in the series. Also, the phase relationships between the entries may be utilized to provide a graphic analysis in certain types of problems. In carrying out the aforementioned procedure, a new set of rules must be adopted for multiplication by means of which the new procedure may be operative to obtain the correct and exact answer attributed to the computer system of the present invention. Therefore, the first requirement of the novel computation system is that the entered quantities be factored into entry factors which are prime with respect to each other. With the entries so conditioned, they are then separated into the aforesaid portions hereafter referred to as modulo and residue. The entry is then utilized for the selection of a number series and to determine the phase relationships between the number series. When all of the series so selected and phased, provide matching residue terms, the number of terms before which matching occurs and the residue value represented by the matching terms will provide the correct and exact answer or product of the entered quantities. It will therefore be apparent from the foregoing, that the mechanism performing the computation operations will involve a plurality of simultaneously operating components representing unending series of numbers programmed in accordance with the entry factors, with the operations stopping when coincidence or matching occurs. The answer is thereby compiled by maintaining a count of the operations and registering the value of the common term by reason of which the operations were stopped.

Although particular mechanisms will be described hereafter in connection with the performance of the above described computation system operations, it will be appreciated that other equivalent mechanisms may be resorted to which follow the operational or functional principles to be hereafter set forth. Also, the input and answer output components described in connection with the computation stage of the computer, may also be designed to perform the indicated functions preparatory to the computation stage of the computer and for receiving the output of the computer stage, by utilizing already known mechanisms performing analogous functions in other computer systems.

These, together with other objects and advantages which will become subsequently apparent reside in the specific principles of construction and operation as more fully hereinafter described and claimed, reference being had to the accompanying drawings forming a part hereof, wherein like numerals refer to like parts throughout, and in which:

FIGURE 2 is a fluid pressure circuit diagram of a portion of the computation stage of the computer.

FIGURES 3 through 8 are partial pneumatic phase diagrams illustrating computer stage operations performed with respect to one exemplary entry.

FIGURES 9 through 12 are pneumatic phase diagrams illustrating computer stage operations with respect to another entry.

FIGURE 13 is an enlarged partial sectional view of a portion of the pneumatic circuit diagram illustrated in FIGURE 2.

FIGURE 14 is an enlarged sectional view through a valve mechanism illustrated in FIGURE 2.

FIGURE 15 is a sectional view taken through a plane indicated by section line 15—15 in FIGURE 14.

FIGURE 16 is a partial longitudinal sectional view of the computer stage programmer.

FIGURE 17 is a sectional view taken substantially through a plane indicated by section line 17—17 in FIGURE 16.

FIGURES 18 and 19 are phase diagrams in connection with the entry conditioning of the computer programmer.

FIGURE 20 is an exemplary circuit control diagram that may be utilized in conjunction with the entry procedure illustrated by FIGURES 18 and 19.

FIGURE 21 is a partial sectional view of an answer unit utilized within the answer compilation stage of the computer.

FIGURE 22 is a front elevational view of the unit illustrated in FIGURE 21.

FIGURE 23 is a flow diagram of the operations performed on a specific problem proceeding through the computer system of the present invention.

FIGURE 24 is a chart of the number series utilized in connection with the residue portions of computer stage entries according to one specific embodiment of the invention.

FIGURE 25 is a graphical illustration of the mathematical relationship underlying the operation of the present invention.

Figure 1:
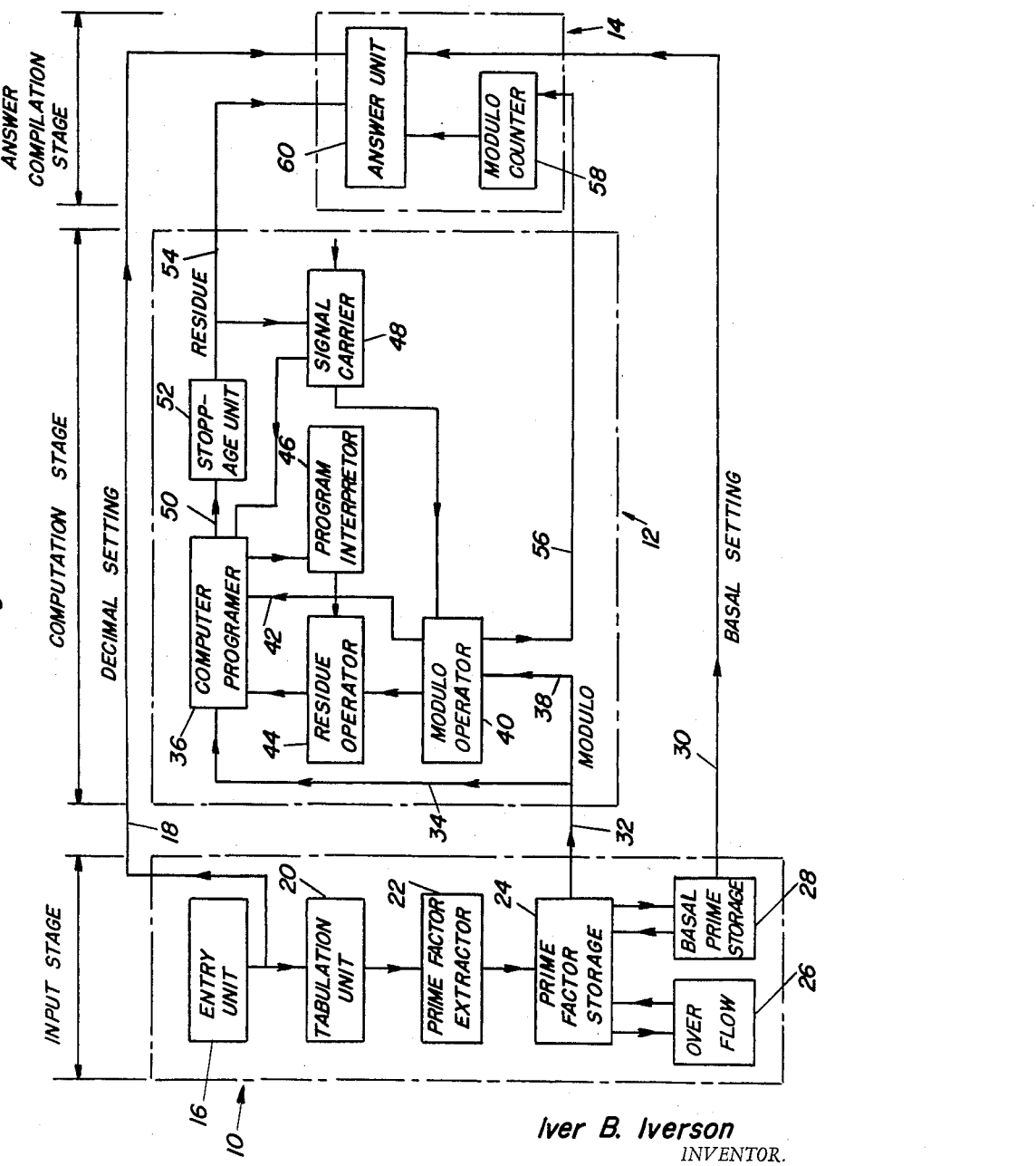
FIGURE 1 is a work flow diagram of a computer system in accordance with the present invention.

FIGURE 25 graphically illustrates the underlying mathematical basis for the novel computation system of the present invention. The abscissa of the graph shown in FIGURE 25 represents the number value of a product based on a selected basal unit (B) with respect to which the entered quantities X and Y are compared and separated into modulo portion $MxB$ and $MyB$ respectively exceeding the basal unit and residue portions $Rx$ and $Ry$ respectively, less than the basal unit. If the quantities X and Y are prime with respect to each other, their product (P) will be depicted by adding each quantity to itself so that their sums will match or coincide for the first time at a number value of $NB+R$ (N basal units plus an excess R thereover of a value less than the basal unit B). When compared with the abscissa scale, it will be observed that the first quantity $x$ having for example a modulo of 2B, exceeds the lower nearest basal number value 2B or starting phase position by $Rx$ representing a first term of a series, the last term of which is R. This series therefore represents or is the operator for the entered quantity X. The second term of the series is $2Rx$ spaced from the first term by 2B. It will therefore be apparent that succeeding terms are obtained by adding the entered quantity to the preceding term and then subtracting the modulo quantity until a term would be obtained of a value that exceeds the basal unit value B (for example $3Rx$ in FIGURE 25). This term thus constitutes the beginning of a new sequence with a minimum value term $(3Rx-B)$ with a phase shift of one basal unit from the preceding term. Accordingly, each entered quantity will be represented by a cyclic series having residue value terms which coincide at a value R. It will however be observed that the first term of each series is out of phase with each other in accordance with the modulo portion of the entered quantity. For example, the first term $Ry$ of entered quantity Y in FIGURE 25 starts after M basal units as compared to 2 basal units for quantity X. The number of basal units N after which the matching residue term R of all the series occurs will therefore reflect both the modulo portion of the entered quantity and the phase shifts that occur or the number of times the basal unit B is exceeded by the series characterizing the entered quantity.

The formation of an operator series with respect to each of the entered quantities may therefore be summarized in the following rules based upon the foregoing mathematical relationships explained with respect to and evident from FIGURE 25.

(a) The first term is the residue of the entry.

(b) The first term of the series starts at a phase position corresponding to the number of basal units in the modulo portion of the entry.

(c) The terms following the first term are obtained by adding the entry residue to itself each time except when the term value exceeds the value of the basal unit, in which case the term value is the excess over the basal unit value.

(d) The terms are spaced from each other by the number of basal units in the modulo portion of the entry except when the term is equal to or is the excess over the basal unit value, in which case a phase shift of one basal unit occurs.

(e) The product of all of the entered quantities is obtained when the residue terms of all the operator series match at the same phase position, with the number of basal units corresponding to this phase position forming the modulo portion of the product and the matching residue term, the residue portion of the product.

In order to illustrate the foregoing by one specific example, consider three entry quantities $X=2$, $Y=5$ and $Z=9$. Also, selecting at random a basal unit value $B=4$, it will be appreciated that each entry may be reduced to modulo and residue portions in accordance the expressions:

$$X=MxB+Rx,\ Y=MyB+Ry,\text{ and }Z=MzB+Rz$$

where M equals the number of basal units and R equals the residue value less than the value of B. Thus, $2=0(4)+2$, $5=1(4)+1$, and $9=2(4)+1$.

The operator series corresponding to each of the three exemplary entries may therefore be formed as indicated on the following chart:

| Phase position or number of Basal Units (B) | Entries (MB+R) | | |
|---|---|---|---|
| | $2=0(4)+2$ | $5=1(4)+1$ | $9=2(4)+1$ |
| 0 | 2 | 0 | 0 | Start position equal to no. of basal units in modulo (2).
| 1 | 4 | 1 | 0 |
| 2 | 2 | 2 | 1 |
| 3 | 4 | 3 | 0 | Spacking between terms equal to no. of basal units in modulo (2).
| 4 | 2 | 4 | 2 |
| 5 | 4 | 0 | 0 |
| 6 | 2 | 1 | 3 |
| 7 | 4 | 2 | 0 |
| 8 | 2 | 3 | 4 |
| 9 | 4 | 4 | 0 |
| 10 | 2 | 0 | 0 | Spacing between cycles includes one additional basal unit.
| 11 | 4 | 1 | 1 |
| 12 | 2 | 2 | 0 |
| 13 | 4 | 3 | 2 | One sequence and/or cycle of terms.
| 14 | 2 | 4 | 0 |
| 15 | 4 | 0 | 3 |
| 16 | 2 | 1 | 0 |
| 17 | 4 | 2 | 4 |
| 18 | 2 | 3 | 0 |
| 19 | 4 | 4 | 0 |
| 20 | 2 | 0 | 1 |
| 21 | 4 | 1 | 0 |
| 22 | 2 | 2 | 2 | Matching residue terms.

It will therefore be observed that the series terms match or coincide at a residue value term of 2 at a phase position corresponding to 22 basal units each having a value of 4 so that $22(4)+2=90$ which is the product of (2), (5), (9), the entry quantities. It will be further observed however that the entry quantities are all prime with respect to each other. This is a prerequisite to proper application of the computational method since the presence of any factor common to two or more entry quantities would introduce error. As a further specific example of the foregoing, consider the product answers obtainable alternatively by entries 9 and 18 with respect to reference entry 16 and a basal unit value of 7, by the computation method as illustrated on the following chart:

| Phase Position | Entries | | |
|---|---|---|---|
| | Reference 16=2(7)+2 | Non-Prime 18=2(7)+4 | Prime 9=1(7)+2 |
| 1 | 0 | 0 | 2 |
| 2 | 2 | 4 | 4 |
| 3 | 0 | 0 | 6 |
| 4 | 4 | 0 | 0 } one sequence |
| 5 | 0 | 1 | 1 |
| 6 | 6 | 0 | 3 } cycle |
| 7 | 0 | 5 | 5 } 2nd sequence |
| 8 | 0 | 0 | 7 |
| 9 | 1 | 0 | 0 |
| 10 | 0 | 0 | 2 |
| 11 | 3 | 2 | 4 |
| 12 | 0 | 0 | 6 |
| 13 | 5 | 6 | 0 |
| 14 | 0 | 0 | 1 |
| 15 | 7 | 0 | 3 |
| 16 | 0 | 0 | 5 |
| 17 | 0 | 3 | 7 |
| 18 | 2 | 0 | 0 |
| 19 | 0 | 7 | 2 |
| 20 | 4 | 0 | 4—Matching residue terms of prime entries. |
| 21 | 0 | 0 | 6 |
| 22 | 6 | 4 | 0 |
| 23 | 0 | 0 | 1 |
| 24 | 0 | 0 | 3 |
| 25 | 1 | 1 | 5—Matching residue terms of non-prime entries. |

From the foregoing discussion, it will be appreciated that the present invention is particularly concerned with a novel computation system which may be applied in various different ways to the solution of problems. The significance of the computation system arises from the fact that exact solutions may be obtained to problems which heretofore defied exact solutions in any practical manner. The computation system is also significant because of a novel computer stage operation and arrangement required in order to carry into effect the principles of the system. The other components of a complete computer are accordingly geared to the requirements of the computation system of the facilities provided to carry out the system procedures. For the purpose of describing one specific embodiment, the following set of rules underlie the construction and arrangement to be hereafter described:

(1) The problem entry quantities are factored into entries which are prime with respect to each other.

(2) The primed entries are separated into a residue portion which consists of the right hand digit or digits, of the entry and a modulo portion which consists of all of the remaining left hand digits.

(3) Each residue is then added to its original entry and compared with a base number, which will be 10 in the following description, until the sum exceeds the base number at which time the base number is subtracted from the sum and then the addition of the residue is resumed.

(4) When the residue sums of all the entries are the same, the operations stop.

(5) The number of operations are counted and the final residue sum common to all of the entry series is recorded. The answer will then be the number of operations times 10 which represents the modulo of the answer plus the final residue sum which represents the residue portion of the answer. This answer represents then the product of all of the originally entered quantities.

Before proceeding with the description of one exemplary embodiment for carrying out the method of the present invention, it would be advisable to define some of the terms used hereinbefore and hereafter. Accordingly, the definitions set forth in connection with the following listed terms have substantially been adhered to:

Basal Number: That number value upon which any specific numbering system is based. For example, the decinary numbering system is based on the basal number, ten.

Basal Prime: Any prime number which is a factor of the selected basal number.

Residue: Any number which is smaller in magnitude than the basal number.

Modulo: The remainder of any number value after the residue has been separated therefrom.

Phasing: Arranging several cyclically repeating series of differing periods in a specific positional relationship with respect to each other.

Prime entries: Quantities which are not factors of one another nor capable of being factored by a common number.

Prime Number: Any number value which is evenly divisible only by itself and by unity. Except for the input and answer stages of the computer, the placement of the decimal point is not considered in determining whether a number is a prime number.

Cycle: A plurality of terms which are repeated to which there may be assigned a numerical value called a period. In the present case a cycle is composed of a number of sequences of terms each beginning with a term of minimum value and terminating with a term of maximum value.

Series: A continuing and unending progression of terms differing from each other in accordance with a predetermined pattern. The pattern as herein referred to, is of a cyclic nature including sequences between terms of minimum and maximum value. The pattern is further characterized as being of a repeating nature in that either the period of duration of each cycle and the term values thereof are the same, or that the series is formed by a continuously fluctuating group of different sequences.

Referring now to FIGURE 24, it will be observed that where a base number of 10 is utilized, each entry will have a residue value between 1 through 9. Each of the numbers 1 through 9 representing the residue portion of the entries will accordingly have its own characteristic cyclically progressing series as charted in FIGURE 24, which exemplifies entries between 11 and 19 inclusive. As heretofore described, each of the series is obtained by adding the entry number to its residue portion and then subtracting the base number until the sum exceeds the base number 10 at which time the base number is subtracted therefrom without prior addition. Thereafter the addition and subtraction operations are resumed. Each of the addition-subtractions, and subtractions only, are referred to as an operation as indicated in FIGURE 24. It will be observed that in FIGURE 24, each of the residue number series are in phase with each other. The relative starting points for each of the number series as hereinbefore mentioned represents the zero point of the entry. As shown in FIGURE 24, the residue number series being in phase with each other starting at operation 1 are therefore all phased for a modulo value of 10. It will therefore be apparent, that proper coincidence will eventually occur between the terms of the residue number series. It will be further apparent that coincidence will also eventually occur between the terms of the series starting at different points dependent upon the phase relationship of the relative starting points which is determined by the modulo portion of the entry. For example, the residue numbers 1 and 2 as illustrated in FIGURE 24 have their series beginning at operation number 1 which represent respectively entries of "11" and "12". The number series for the entries "11" and "12" accordingly match at operation number 13 indicating a final residue value of 2. Accordingly, the number of operations (13 times the base number 10) plus the final residue value (2) will render the answer 132 which is the product of 11 and 12. It will be further observed, that correct answer matching occurs only with respect to residue numbers which are below the base number 10 and only where the entries are prime with respect to each other. For example, the entries "16" and "18" as represented by the series corresponding to the residue numbers 6 and 8 match at operation number 14 because of the common term value of 4. However, the entries 16 and 18 are not prime with respect to each other for which reason the matching residue value of 4 at operation 14 does not provide the correct answer.

From the foregoing, it will be appreciated that the number of entries capable of being handled by a computer made in accordance with this invention, will depend upon the number of banks provided for receiving an entry or entry combination within the computation stage. In the foregoing description, four such banks are set forth. It will also be apparent that before any problem may be entered into the computation stage the problem must be reduced to entries which are prime with respect to each other. Inasmuch as most entry quantities may be factored into the smaller prime numbers 2, 3, 5, 7 and 11, etc., and since the prime numbers 2 and 5 may be combined to form the base number 10, four banks have been selected inasmuch as most of the entries of any problem may be reduced to four categories of prime relationship. Accordingly, most entry quantities may be factored into the low prime numbers and all such low prime number entries combined into powers thereof. The highest powers of such prime number entries will accordingly constitute the prime entries forwarded to the computation stage of the computer. Also, the lower prime entries 2 and 5 or powers thereof will be matched in order to extract the base numbers with any excess of such basal primes being forwarded to the computation stage. The number of zeros resulting from the combined or matched basal primes will therefore be directly transmitted to the answer compilation stage. Also, an entry category may be provided for all prime entries in excess of the aforementioned four prime categories.

In accordance with the above operational principles, the input stage is constructed for operative association with the novel computation stage of the present invention. It should be appreciated that no specific equipment is described in connection with the input stage since the contribution of the present invention resides in a computation method. The description presented in connection with the input stage however specifies the restrictions imposed thereon in accordance with the requirements of the computation stage and associated method. It will be further appreciated that information converting and handling systems are available or capable of being designed pursuant to the instructive principles of this invention although such systems are not being claimed and are beyond the scope of the present application. Referring therefore to FIGURE 1, it will be observed that the computer device of the present invention is represented by a work flow diagram including an input stage component generally referred to by reference numeral 10, a computation stage component generally referred to by reference numeral 12 and an answer compilation stage component generally referred to by reference numeral 14. The component 10 accordingly conditions the entered quanities as hereinbefore indicated. The component 10 therefore includes an entry unit 16 which may be of any known construction including a control panel onto which the problem may be entered by selective actuation of control buttons and other such actuators. The output of the entry unit will accordingly be directly fed by line 18 to the answer component 14 for the purpose of properly setting the decimal point therein. The entry unit output will also feed into a tabulation unit 20 by means of which the entered quantities may be transformed into their prime factors. The unit 20 may accordingly include recorded lists of numbers and their prime factors, such recording being accomplished by punch cards, magnetic tapes, paper tapes or any other form of tabulation. Data conversion systems involving a comparison between input information and a library of recorded information have heretofore been devised for similar although specifically different purposes as disclosed in Patent Nos. 3,000,556 and 2,975,965. The tabulation unit 20 will accordingly feed into the prime factor extracter 22, the prime factors for each of the entered quantities. In the extracter 22, like factors will be combined into powers of that prime factor, the powers being reduced for accomplishing division and extraction of roots. The prime factor extracter 22 then feeds the results thereof into the prime factor storage 24. In the storage 24 the prime factors and powers thereof from each of the entered quantities are assembled and compiled into the heretofore designated prime entry categories. The other primes in excess of nominal storage capacity, are retrieved and fed into the overflow 26 for the purpose of returning them to the storage 24 for combination with excess basal prime numbers from the basal prime storage 28 or any other previously stored entry. Data handling systems involving the combining of similar information and retrieval thereof have heretofore been devised for similar purposes as disclosed in Patent Nos. 3,027,070 and 3,009,636. The basal prime numbers (2 and 5) matched within the basal prime storage 28 then issues instructions through line 30 to the answer component 14 for the purpose of supplying thereto the proper number of zeros corresponding to the matched basal prime numbers eliminated from the input component 10. Thus decimal placement instruction derived from decimal input information from units 16 and 28 may be transmitted in accordance with any known system such as disclosed in Patent No. 2,961,155.

It will be further observed in FIGURE 1, that the output 32 from the input component 10 issues a signal by line 34 to the computer programmer 36 so as to initiate the corresponding series program for the residue portion of the prime entry fed into the component 12. Also, line 38 represents the signal received by the modulo operator 40 to control its operation in accordance with the modulo of the prime entry. The modulo operator 40 accordingly also is operatively connected to the computer programmer by line 42 controlling the operation of the component 12. The residue operator 44 will accordingly upon receipt of the proper signal from the modulo operator 40 to which it is operatively connected, feed the computer programmer in the automatic sequential manner hereinbefore indicated. The sequential operation of the residue operator 44 will accordingly be controlled by the programmer interpreter 46 which receives its program from the computer programmer 36. In order to carry the signals issued from the modulo operator to the programmer 36 and to the residue operator 44 as well as to issue signals from the computer programmer 36, a sychronizing signal medium is supplied by the signal carrier 48. The computer programmer 36 will accordingly issue an output signal through line 50 to the stoppage unit 52 which will transmit the signal to line 54 only when matching or coincidence occurs. The residue signal in line 54 is accordingly fed to the answer component 14 and also to the signal carrier in order to cut off the signal medium for stopping operation of the computation component 12. Operation of the component 12 is counted by means of an output 56 from the modulo operator 50 through which operations are performed in order to obtain the repeating series function. It will therefore be observed that the modulo counter 58 connected to the modulo operator by the line 56 is operatively connected to the answer unit 60 in order to apply thereto its count which is also combined with the residue number signal in line 54 within the answer unit 60 as well as with the decimal setting from the entry unit 16 and the basal zero setting from the storage 28, in order to compile the answer.

In order to further explain operation of the computer device, attention is invited toward FIGURE 23 wherein a problem flow diagram illustrates the manipulation of specific entered quantities by means of which the computer device solves a specific problem. Accordingly, it will be observed in FIGURE 23 that the quantities 216, 535, and 7865 are entered as multiplying factors with the quantity 33 being entered as a divisor. The entry 216 is accordingly converted into the indicated powers of prime numbers 2 and 3. The other entered quantities are similarly converted into prime numbers 3, 5, 7, 11 and 13 or powers thereof as indicated. The prime numbers are then combined into separate categories for storage including storage categories for prime numbers 3, 7, and 11. The prime number 13 on the other hand is fed to an overflow from which it is combined with an excess basal prime 2 within a fourth excess storage category. Each of the storage categories will accordingly provide entries for the computation stage which are prime with respect to each other as indicated in FIGURE 23. This is a necessary requisite in order to obtain the correct answer utilizing the novel computation system, of the present invention. It will be further observed, that all of the prime factors 2 and 5 are combined within the basal prime storage and matched therein with the excess of one of the basal primes 2 in the illustrated case, being forwarded to the fourth storage combination with the overflow prime factors. Also, the basal prime storage issues a signal in accordance with the number of matched basal primes to the answer in the form of a corresponding number of zeros. Each of the prime entries from the storage categories are then separated by the computer into their residue and modulo as indicated in FIGURE 23. The modulo entries by means of the computer operating principles hereinbefore described produce the indicated digits 2, 7, 5, 4, 1 on the left of the answer unit, while the residue number entries combined by the novel computation system produce the final residue 8 which when combined with the modulo digits and the two zeros from the basal prime storage, indicates the correct and exact answer to the problem.

Inasmuch as the essential novelty of the present invention resides in the computing system one particular form of mechanism will be described in order to carry out the automatic sequential operations heretofore referred to, which mechanism must also include facilities for varying the program thereof with respect to each of the prime entries and also for issuing the modulo count signal and residue answer. FIGURES 2, 16 and 17 illustrate the mechanism by means of which the computation component 12 is so operative.

Referring first to FIGURES 16 and 17 in particular, it will be observed that a plurality of concentric tube members are mounted within a housing 62 for sliding movement with respect to each other. The slidable tubular members are respectively referred to by reference numerals 64, 66, 68 and 70. The inner tubular member 72 which is closed at both ends is stationary and constitutes a feed cylinder into which fluid under pressure is supplied by means of inlet conduit 74. The fluid accordingly represents the signal carrying medium which is operative to provide pulses representing the singals referred to in the work flow diagram of FIGURE 1 hereinbefore described. The four tubular members 64, 66, 68 and 70 correspond to the number of entries (that are prime with respect to each other) that the computer device of the particularly described embodiment is capable of handling at one time. It should be appreciated however that the capacity of the computer device may be increased by a corresponding increase in the number of tubular members as desired, as well as by entry of several factors on one tubular member. It will be further observed that each of the tubular members has associated therewith four lines of perforations 76 which are in radial alignment with each other and with perforations 78 in the fixed feed cylinder 72. The number of perforations in each of the four lines in each of the slidable tubular members, represent the entry numbers, the first perforation being zero while the last perforation to the left thereof in each line representing the maximum entry number for which the computer device is designed. Therefore, associated with a different line of perforations on the respective slidable tubular members, is a slide member 80. The line of perforations with which the slide member 80 is associated is therefore referred to as a computer line for the particular slidable tubular member. There is one hole only in each of the slide members 80 referred to as the computer holes and generally referred to by reference numeral 82. By shifting the slide member 80 with respect to its associated slidable tubular member, the computer hole 82 may be aligned with one of the perforations in the computer line of the slidable tubular member corresponding to the residue portion of a prime entry in order to so direct the fluid pressure from the feed cylinder 72 so as to initiate automatic sequential operation in accordance with the computing system. A stationary manifold 84 is therefore provided in sealing relationship to the outer tubular member 70 in order to receive fluid under pressure through the perforations 78 and 76 which are aligned with the computer hole 82 in the slide member 80. A manifold 84 is therefore associated with each of the slide members 80 as more clearly seen in FIGURE 17 which are angularly spaced with respect to each other. Each of the manifolds 84 includes a portion separated into ten individual compartments 86 through which fluid pressure signals are transmitted for the residue operators. The first individual compartment on the right as illustrated in FIGURE 16, referred to by reference numeral 88 constitutes a zero signal connection operative to prevent operation of the residue operators. The manifolds 84 also include a portion 90 which is in communication with a bank of ten perforations for the purpose of providing a fluid pressure connection to the modulo operators.

Each manifold 84 which is fixedly mounted is provided with individual fluid connecting lines 91 through 99 connected to the individual compartments 86 respectively and a line 100 connected to the zero compartment 88. Also, a line 102 is connected to the portion 90 of the manifold 84 for the purpose of pulsing the modulo operators. Each of the slidable tubular members accordingly has associated therewith a set of signal lines 91 through 99, 100 and 102 which are operatively connected to fluid control assemblies 104 operatively connected to the respective slidable tubular members for the purpose of slidably shifting the slidable tubular members in accordance with a sequential program determined by the initial setting of the slide member 80 on its respective tubular member. FIGURE 16 accordingly illustrates mechanical connections 106 between each of the tubular members and its associated fluid control assembly 104.

It will therefore be appreciated that a residue signal from the input components 10 of the computer device is initially entered into the computer programmer by means of shifting the slide member 80 with respect to an associated computer line on the tubular member. Referring therefore to FIGURES 18, 19 and 20, it will be observed that one slide member 80 is schematically shown associated with a slidable tubular member with the computer hole 82 thereof being aligned with a zero perforation in the slidable member when the computer line or member is extended to the left as illustrated in FIGURE 18 in preparation for entry of a residue. It will therefore be observed that the slide member 80 may be releasably clutched for movement with the slidable member by means of a magnetic device 108 or other equivalent device and is connected by any suitable linkage 110 to a slide member 112 within a residue entry control mechanism 114. The slide member 80 has accordingly been moved to the left of its maximum position as determined by the stop member 116 within the mechanism 114, at which point the clutch device 108 is released so that the slidable member may be moved to its extreme left position in which the zero perforation thereof is aligned with the computer hole 82 as shown in FIGURE 18. A movable stop device 118 slidably mounted within the control mechanism 114 may then be positioned in accordance with the residue portion of a prime entry signal from the input component by any suitable means reflecting the residue portion of the prime entry. The tubular member is then shifted to its extreme right position as indicated by the arrow 120 in FIGURE 19 after slide 80 which has been clutched to the slidable member by the clutch device 108. The slide 80 is therefore moved with the tubular member to the right until the slide 112 engages the stop device 118 at which point the clutch device 108 releases permitting the tubular member to continue toward its fully retracted position indicated by the arrow 120 so that the computer hole 82 then becomes aligned with one of the perforations in the tubular member corresponding to the residue entry as illustrated in FIGURE 19. Next the clutch device 108 is engaged so that the slidable member 80 may be movable with the tubular member thereafter in order to effect operation of the residue operators in the hydraulic control assemblies 104.

FIGURE 20 illustrates one exemplary form of control mechanism that may be utilized in order to accomplish the aforementioned entry procedure. Accordingly, a circuit 122 may be provided including a source of power 124 with the circuit being normally closed by means of switches 126 and 128 located on the slide device 112. The magnetic clutch device 108 is accordingly normally energized to cause the slide 80 to move with the slidable tubular member with which it is associated. When however the slide 112 abuts against the stop 116 by an entry clearing operation, the switch 128 is opened so as to deenergize the magnetic clutch device 108 permitting the tubular slide member to move to its extreme left position for alignment of the computer hole 82 with the zero perforation as indicated in FIGURE 18. The adjustable stop device 118 may then be positioned in accordance with an entry signal which would also simultaneously close a circuit through conductors 130 and 132 reenergizing the clutch device 108. The slide 80 and 112 then move toward the right as viewed in FIGURES 18 and 19 with the tubular slide member until the slide 112 engages adjustable stop 118. The switch 126 is then opened to deenergize the clutch 108 so that the tubular member may continue to move alone toward the right as viewed in FIGURE 19. To begin operations the switch 134 is closed so as to again energize clutch 108. Thereafter, the slide member 80 will be movable with the tubular slide member without the clutch 108 being effected by either of the switches 126 and 128. When the computer device is to be cleared, the switch device 134 will then be reopened so as to render the switches operative for clearing and entry operations. The foregoing description of the slide entry control for the programmer is only exemplary it being apparent that any other equivalent and suitable type of control may be utilized for the indicated purpose.

As hereinbefore indicated, each of the tubular slide members has associated therewith a fluid control assembly 104 which contains the modulo and residue operators and interpreter controls programmed by the respective tubular slide members and associated slide members 80 in order to perform a number of sequential operations which are counted with the final residue answer recorded and compiled by the answer component 14 in order to render a correct and exact answer to a problem. FIGURE 2 illustrates a fluid circuit diagram for one of the fluid control assemblies 104, it being understood of course that the other control assemblies 104 are identical in construction and operation. It will also be observed that the tubular slide member with which the assembly 104 is associated is also schematically illustrated in FIGURE 2 and that the fluid pressure inlet line 74 is selectively connected to one of the lines 91 through 99, 100 and 102 by the setting of the computer hole in the slide 80 and the shifting of the slidable tubular member. The lines 91 through 99, 100 and 102 supply control pressure to the fluid control system which is of a relative low value, for example, four p.s.i. as indicated in FIGURE 2. The supply of control pressure in inlet line 74 is at an initial value of ten p.s.i. Two types of control valve assemblies are provided in each fluid control system including a modulo operator control valve assembly 136 and a plurality of residue operator control valve assemblies 138, there being nine of such control valves 138 corresponding to each of the residue numbers one through nine and each being operatively connected to one of the residue control lines 91 through 99. The zero control line 100 on the other hand is operatively connected to each of the residue control valve assemblies 138 by branch conduits 141 in order to condition the valve assemblies 138 to a position in which a high line pressure of 60 p.s.i. is disconnected therefrom. The high pressure supply line 140 is accordingly connected through a cut-off mechanism 142 to a supply line 144 connected to the inlet of each of the residue control valve assemblies 138. Each of the valve assemblies 138 also includes a vent port and an outlet port through which control over the residue operators is exercised. It will therefore be observed that a plurality of residue operator mechanisms are provided including a fixedly mounted cylinder device 146 which slidably mounts a one increment piston 148 therewithin. The piston 148 therefore has a stroke the length of which relative to the stroke of the other residue pistons and the modulo operator is one increment. Slidable relative to the one increment cylinder device 146 is a two increment cylinder device 150 having a two increment piston 152 which is connected to the one increment piston 148. A four increment cylinder device 154 is movable with the two increment cylinder device 150 and slidably mounts therewithin a four increment piston 156. The four increment piston 156 is connected to a seven increment piston 158 which is slidably mounted within a cylinder device 160 which is slidably movable relative to the cylinder devices 150 and 154. Also connected to the cylinder device 160 is a cylinder device 162 of the modulo operator device generally referred to by reference numeral 164 within which a modulo piston 166 is slidably mounted for a ten increment stroke. The modulo piston 166 in turn is connected to the slidable tubular member with which it is associated for shifting thereof in accordance with the automatic sequence program. As will be further explained the working chambers 168, 170, 172 and 174 on the residue operators are selectively connected to the outlet of the corresponding residue control valve assemblies 138 for supply thereto of a high line pressure of 60 p.s.i. When the residue control valve assemblies 138 are disconnected from the respective working chambers of the residue operators the aforementioned working chambers reduce in pressure to ten p.s.i. or less through check and bleed valves. The return chambers 176 and 178, 180 and 182 of the residue operators are supplied with a return pressure of forty p.s.i. by connection to a pressure reducing valve mechanism 184 connected to the conduit 186 which in turn is connected to the supply line 140 following the cut-off mechanism 142. The working chamber 168 of the one increment residue operator is therefore operatively connected to the first control valve assembly 138 for supply of sixty p.s.i. pressure thereto or disconnection therefrom, by an outlet conduit 188 which is connected to a one-way check valve mechanism 190, conduit 192, check valve 194, line 196, check valve 198 and finally line 200 connected to one end of the cylindrical device 146 in communication with the working chamber 168. Accordingly, when the first control valve assembly 138 admits pressure at sixty p.s.i. to the outlet conduit 188, a pressure of sixty p.s.i. will be supplied to the working chamber 168 in order to displace the one increment piston 148 against the forty p.s.i. pressure in the return chamber 176. When the first control valve assembly 138 disconnects the sixty p.s.i. pressure from the working chamber 168, the pressure will be reduced through the check and bleed valve mechanism 202. It will also be apparent, that when the sixty p.s.i. pressure is supplied to the conduit 200 for displacing the one increment piston 148, a control pressure will be bled through the mechanism 202 into the conduit 204 so as to actuate the modulo control valve assembly 136 and the predetermination counter 205.

The predetermination counter 205 is a device well known in the computer art wherein a number is entered by some remote control from the input stage—in the present case one less than the modulo portion of the entry. Control signal pulses applied to the predetermination counter are then operative to reduce the entry until fully depleted after which the counter is operative to transmit a signal. In the present case therefore, the counter 205 will transmit one signal pulse from line 102 to 103 only after a total number of signal pulses in line 204 equal to the modulo portion of the entry. Therefore, the counter 58 connected to 205 by line 264 will provide a count equal to one less than the modulo portion before the modulo control valve 136 is pulsed through line 103 with the next pulse corresponding to the modulo count.

As a result of the control pressure existing within the conduit 204, the supply line 140 will be connected through the control valve assembly 136 to the outlet conduit 206 which is connected to chamber 208 of the modulo operator 164 to thereby displace the modulo piston 166 in one direction. Also control pressure in conduit 204 pulses the predetermination counter 205. When, however, the control pressure line 102 is pressurized through the slidable tubular member, the control valve assembly 136 after depletion of the predetermination counter will be actuated in the opposite direction so as to connect the high pressure supply line 140 to the other outlet conduit 210 which is connected to the other chamber 212 of the modulo operator 164, in order to displace the piston 166 in the opposite direction.

Continuing now with the description of the fluid control system of FIGURE 2, it will be observed that the second residue control valve assembly 138 is connected by line 214, check valve 216, line 218, check valve 220, line 222, check valve 224 and finally line 226 to the working chamber 170 of the two increment cylinder device 150. The line 226 is also connected by the check and bleed mechanism 228 to the control pressure line 204 for the modulo control valve assembly 136 and the predetermination counter. The third residue control valve assembly is connected by outlet conduit 230, check valve 216, and line 218 to the working chamber 170 of the two increment cylinder device 150 as described with respect to the second residue control valve. The third residue control valve however is also connected to the check valve 190 whereby it is simultaneously connected to the one increment residue cylinder device 146. Accordingly, actuation of the third residue control device 138 will produce a three increment stroke by actuating both the one and two increment cylinder devices. The fourth residue control device 138 is connected to the working chamber of the four increment cylinder device 154 by means of lines 232, check valve 234, line 236, check valve 238 and finally line 240. The line 240 is connected to the control conduit 204 for the modulo control valve 136 and predetermination counter through the check and bleed mechanism 242. The fifth residue control valve 138 has connected thereto an outlet conduit 244 by means of which the fifth residue control valve 138 is operatively connected to both the four increment cylinder device and the one increment cylinder device. The sixth residue control valve mechanism 138 is connected by the outlet conduit 246 to both the working chambers 170 and 172 of the two and four increment cylinder devices 150 and 154 respectively. The seventh residue control device 138 is operatively connected to the working chamber 174 of the seven increment cylinder device 160 by means of outlet conduit 248, check valve 250, line 252, check valve 254 and line 256. The line 256 is also operatively connected to the check and bleed valve mechanism 258 to the control line 204 for the modulo control valve 136 and predetermination counter. The eighth residue control valve is connected by the outlet conduit 260 to both the working chambers of the one increment cylinder device 146 and the seven increment cylinder device 160. Finally, the ninth residue control valve assembly 138 is connected by the outlet conduit 262 to the working chamber of both the two increment cylinder device 150 and the seven increment cylinder device 160.

From the foregoing, it will be apparent that the selective actuation of any of the residue control valve assemblies will correspondingly cause the residue operator cylinder devices to displace the modulo operator 164 and actuate the predetermination counter with which the residue operators are associated an amount equal to the prime entry value. It will be further apparent however, that each displacement of residue operators and modulo operators in the same direction under the control of a residue control valve, in effect adds the residue value and the modulo entry by shifting the tubular member in one direction. As a result of such shift, the perforation uncovered by the computer hole will be in line with the manifold portion 90 so as to pressurize the control line 102 whereupon the modulo valve 136 is actuated in the opposite direction after depletion of the predetermination counter to shift the modulo piston 166 in the opposite direction and thereby reduce the shift by ten increments from the total shift previously effected in order to complete one cycle of operation. Whenever the latter shift of the modulo piston 166 occurs the control line 102 which is connected to the manifold 90 will also pulse the modulo counter 58 through line 264 which in turn is connected to a portion of the answer unit as indicated in FIGURE 2. Further, it will be observed that each of the control lines 91 through 99 which are pulsed whenever the residue entry with which it corresponds, occurs, pulses the stoppage unit 52. Whenever the stoppage unit 52 is pulsed by the same control line from all of the operating control assemblies 104 (FIGURE 2 illustrating only one of said assemblies) the stoppage unit issues a signal through line 266 to both the cut-off mechanism 142 and the residue answer portion of the answer unit. As a result thereof, the answer unit 60 receives the residue answer and also operation of the control assemblies 104 is stopped by virtue of the cut-off of the high pressure line 140 thereto.

From the foregoing description, it will be appreciated that a complete sequence of operation is effected through the control assembly 104 corresponding to entries having a modulo portion of one, with the described operation of the predetermination counter synthesizing the operations associated with the remaining portion of the modulo. As an alternative procedure, each control assembly may be provided with a plurality of modulo control valves 136 and associated modulo operators to be actuated when a modulo entry portion is made, the residue portion being entered the same as hereinbefore indicated.

Figure 6:
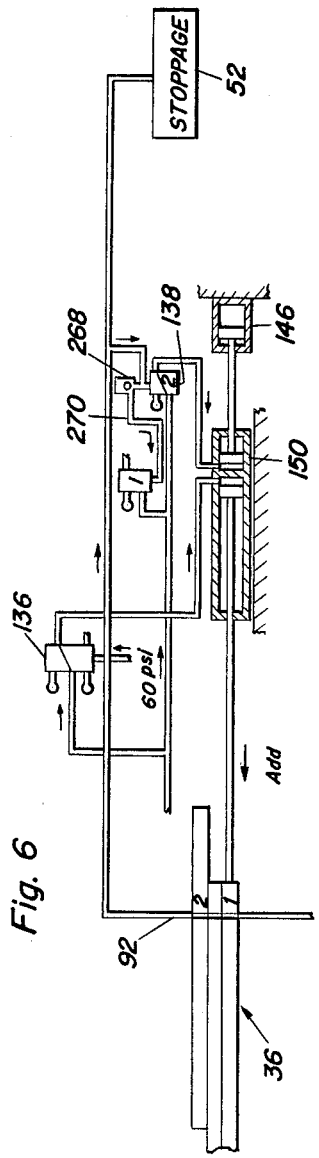
Figure 7:
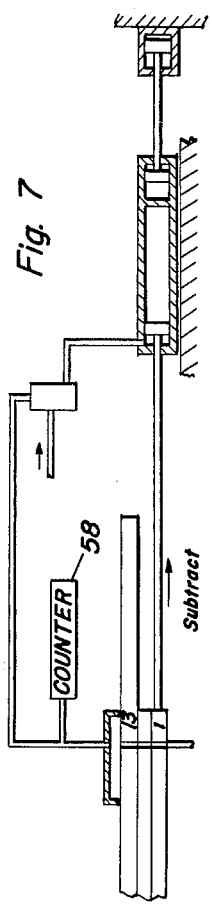
Figure 8:
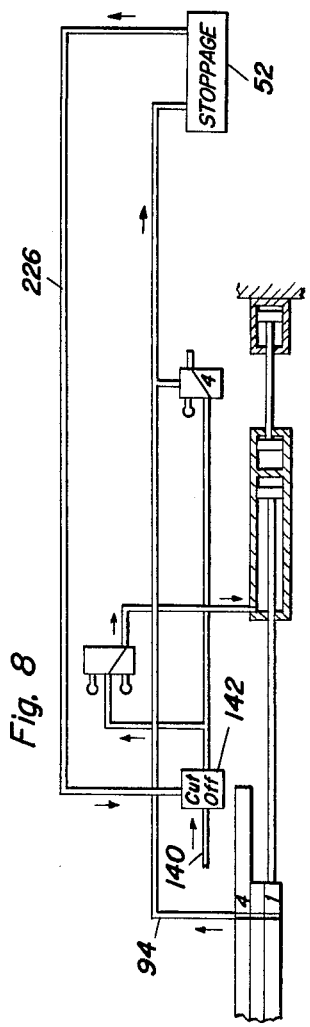

From the foregoing description of the hydraulic control system, automatic sequential operations in accordance with the residue series as charted in FIGURE 24, will become apparent. Reference is therefore made to the phase diagrams in FIGURES 3 through 12 as a further example of the automatic sequential operation which occurs pursuant to the principles of the invention as hereinbefore indicated. It will be observed from FIGURE 3, that the slide member 80 has been positioned with respect to the slidable tubular member so that the computer hole 82 thereof is in registry with the second perforation representing the residue number one. While a modulo entry of ten is indicated, should the modulo entry be higher, the counter 58 will be pulsed a corresponding number of time in order to establish the proper starting relationship before operations begin with the pulsing of the valve 136 through line 102. Accordingly, the modulo control valve 136 is then actuated in order to connect the line pressure to chamber 212 of the modulo operator 164. The entry number 11 as set on the computer programmer 36 will cause movement thereof toward the right as illustrated in FIGURE 3 by ten increments and at the same time pulse the counter 58. The movement toward the right is accordingly identified as a subtracting operation. Referring now to FIGURE 4, it will be observed that when the programmer has been shifted with respect to the stationary manifold 84 by ten increments, registry occurs with the number one residue perforation connected to the control line 91. Accordingly the control pressure of four p.s.i. within the control line 91 actuates the first residue control valve 138 and is simultaneously supplied to the stoppage unit 52. The working chamber 168 of the one increment cylinder device 146 is accordingly pressurized with 60 p.s.i. fluid pressure to displace the other cylinder devices with respect to the cylinder device 146 by one increment in one direction constituting an addition of one. At the same time, control pressure through the check and bleed mechanism 202 is supplied to the control conduit 204 for the modulo control valve 136 whereupon pressure is admitted through conduit 206 to the chamber 208 of the modulo operator 164 causing it to add by ten increments. Accordingly, a total addition of eleven increments will be imparted to the programmer 36 from the position illustrated in FIGURE 4 to the position illustrated in FIGURE 5 so as to bring the programmer 36 into registry with the perforation in the manifold 84 corresponding to a number 12. As a result thereof, the line 102 is again pressurized to actuate the control valve 136 causing the modulo operator 164 to again subtract and at the same time pulse the counter 58. It will therefore be apparent that each time a subtracting operation occurs the programmer 36 is shifted to the right by ten increments. Accordingly, upon completion of the shift to the position illustrated in FIGURE 6, the control pressure within the programmer is in alignment with the control line 29, representing the residue answer of 2. It will then be apparent that the control line 92 will actuate the second control valve 138 through which the working chamber of the two increment cylinder device 150 is pressurized in order to shift the programmer 36 by one increment and at the same time actuate the modulo control valve 136 so as to add ten increments in the same direction for a total of eleven increments. It will also be noted that the control pressure line 92 is connected by a one-way check valve mechanism 268 to the first residue control valve mechanism by line 270 which is operative to positively disconnect said first control valve from its associated one increment cylinder device 146. Also, the stoppage unit 52 is pulsed. As a result of the conditioning of the control system as illustrated in FIGURE 6, the programmer will be shifted from the position illustrated therein to the position illustrated in FIGURE 7 wherein the programmer is aligned with the perforation representing 13, whereupon again a subtracting operation is performed. It will therefore be apparent that when the programmer is initially set at its entry position which in the case of the above example was 11, the system will undergo sequential operations in an automatic manner including a subtracting operation equal to ten increments at which time the operation is counted by a pulse supplied to the counter 58 and then followed by an adding operation always equal to the initial entry value of 11. When each of the hydraulic control systems of the assemblies 104 simultaneously pulse the same control line as for example line 94 as illustrated in FIGURE 8, the stoppage unit 52 will then be operative through line 226 to actuate the cut-off unit 142 disconnecting the line pressure inlet conduit 140, whereupon the operation ceases. It will therefore be apparent that the fluid control system is automatically operative to cyclically add the residue value of the entry by first adding the entry and subtracting therefrom the base number 10. It will be further apparent that when the addition reaches a value wherein the programmer 36 is no longer in registry with any of the control lines 91 through 99, the following operation will not cause an addition inasmuch as the line 102 would again be pressurized causing an extra subtraction operation without any addition.

The foregoing diagrams and explanation describes how the operation progresses with a modulus of 1 (entry 11 to 19). Entry of additional valued modulos are obtained by use of the predetermination counter which operates as a simulated addition of modulo control valves 136 as previously described herein.

The phase description of the fluid control system as described with respect to FIGURES 3 through 8, indicates that for a residue entry of "one," automatic operation corresponds to the sequence 1, 2, 3, etc. as indicated on the chart of FIGURE 24. Similarly, an initial entry of other residue numbers will provide an automatic sequence corresponding to the residue numbers as charted in FIGURE 24. Reference should therefore be made to FIGURES 9 through 12 which illustrate what occurs when the initial entry is 14. In FIGURE 9, an initial subtracting operation occurs when the line 102 actuates the valve 136 to displace the modulo operator 164 to the right. The programmer 36 is accordingly shifted to the position illustrated in FIGURE 10 wherein the control line 94 is in registry with the control pressure inlet so as to pulse the fourth control valve 138. As a result, the working chamber of the four increment cylinder device 154 is pressurized as well as as the chamber 208 of the modulo operator 164 so as to add a total of 14 whereupon the programmer device shifts to the position as illustrated in FIGURE 11. Accordingly, the answer perforation 18 provides communication between the control pressure and the line 102 to again effect the subtracting operation of ten increments, whereupon the programmer device is then shifted to the position illustrated in FIGURE 12 wherein the control pressure is in registry with the control line 98. It will therefore become apparent that with respect to the initial entry of a residue value of four, sequential operation of the fluid control system will correspond to the characteristic series for a residue value of four as charted in FIGURE 24. Corresponding operation of the fluid control system occurs with respect to the other residues as charted in FIGURE 24 in order to provide the indicated series operation.

FIGURE 13 illustrates the hydraulic connection between the respective residue control valve assemblies 138 and the residue control lines 91 through 99 and also the zero control line 100. It will be recalled, that the zero control line 100 is connected by branch lines 142 to each of the residue control valve assemblies 138 so as to hold it in a position disconnecting the high pressure line 144 therefrom. An opposing and dominating control pressure is therefore supplied by each of the control lines 91 through 99 for actuating each of the control valves 138. The one-way check valve mechanism 268 is however interposed in the lines in order to apply the higher control pressure to the other control valves 138 for assuring that they remain disconnected from the high pressure line 144. FIGURE 13 illustrates the check valve mechanism 268 which was also previously referred to in connection with FIGURE 6. It will be observed therefore that the control line is connected by a branch line 272 to the ball check 274 so that when the control pressure line is pressurized the lines 270 and 276 will also be pressurized.

Accordingly, the lines 270 and 276 will be connected through the check valve mechanism 268 to pressurize the other control valve assemblies 138 on that side thereof for maintaining within the branch conduits 142, valve disconnecting control pressure.

The control valve assemblies 138 are more clearly illustrated in FIGURES 14 and 15. It will be observed, that each of the valve assemblies 138 includes a cylindrical valve body member 278 having a large bore portion 280 and a lower and reduced diameter bore portion 282. The upper end of the valve body 278 is enclosed by a cap member 284. Rotatably mounted within the bores of the valve body 278 is a valve actuator generally referred to by reference numeral 286 which includes a rotary valve portion 288 and an upper vane actuator portion 290. A pressure inlet 292 is provided within the lower portion of the valve body 278 as well as a vent outlet 294 in vertically spaced relation thereabove. On the other side of the valve body 278, a pressure outlet 296 is provided. The valve portion 288 is provided with passages 298 and 300 which are 90 degrees displaced with respect to each other so that upon rotation of the valve 286, the outlet 296 will alternatively be connected to the pressure inlet 292 or the vent 294.

In order to control the position of the valve 286 within the valve body 278 in order to make the aforementioned alternative connection, there are provided a pair of angularly spaced inlets 302 and 304 within the valve body 278. The inlets 302 and 304 communicate respectively with passages 306 and 308 formed within an insert 310 fixed to the body member 278 within the larger bore 280 thereof in order to limit angular displacement of the main portion 290 to 90 degrees, and alternatively supply displacing pressure to the valve 286 from the passages 306 and 308. One of the inlets 302 and 304 will accordingly be connected to one of the residue control lines 191 through 199 with which the control valve assembly 138 is associated while the other of the inlets 302 and 304 will be connected to the branch line 142 from the zero control line 100. Accordingly, pressurizing one of the inlets 302 or 304 will position the valve so as to connect the outlet 296 to the vent 294 or position the valve so as to connect the pressure inlet 292 to the outlet 296.

The answer unit associated with the computation component will respond to subtracting pulses applied to the modulo operator as previously indicated and also finally respond to a pulse from the stoppage unit 52 in accordance with the residue value. Also, the answer unit will receive and respond to signals from the basal prime storage unit 28 and the entry unit 16 in order to shift the decimal point to the proper location for obtaining the correct answer. Referring therefore to FIGURES 21 and 22, it will be observed that the answer unit 60 may include a hydraulically actuated ratchet mechanism 312 which receives the pulses applied to the modulo operators 164 for the purpose of actuating the modulo answer portion 314 including counter wheels in a manner well known to those skilled in the art. Similarly, a ratchet mechanism 316 may be provided which will be pulsed a number of times corresponding to the residue value occurring when the stoppage unit issues its signals to provide the residue answer. Any suitable positioning mechanism 318 may also be provided for the purpose of shifting a decimal point as indicated in FIGURE 22 in response to signals received from the basal prime storage 28 through the conduit 320 and from the entry unit 16 through the conduit 322. The manner in which decimal shift signals are derived have been functionally described in connection with the description of the input stage since the decimal location will depend upon the operations performed on entries within the input stage. Accordingly, the specific signal generating apparatus utilized for decimal shift may be varied and is not essential to the invention being asserted.

From the foregoing description, operation and utility of a computer device made in accordance with the principles of the present invention will be apparent. It will therefore be appreciated, that although a particular type of fluid control mechanism has been illustrated in order to accomplish the automatic sequential operation, other forms of mechanisms may be utilized for achieving similar purposes. The essential ingredient of the computer components however will involve simultaneous initiations of automatic sequential operation of a periodically varying nature differing for each of the entries, with the cyclic variations starting at out-of-phase relationship to each other in accordance with the modulo portion of the entry. The amplitude and frequency characteristics of the cyclic varying operation will be selected in accordance with the residue portion of the entry. An exact and correct solution is thereby attained.

The fields of application of such a computer device will be extensive and even beyond present contemplation. This is so because of the ability of the computer device to perform simultaneously multiplication of many factors without the necessity for re-entering sub-products as have characterized computer devices heretofore utilized. Also, by virtue of the computer device's ability to provide exact answers it may be useful for determination of exact fractional values heretofore not accomplished. The computer device will also be of assistance in the development of many theories in connection with nuclear, atomic, molecular and crystalline structure as well as in astrophysical calculations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A system of computation comprising: means for representing a plurality of entries by characteristic series formed by repeating cycles of terms; means for phasing and synchronizing the cycles with respect to each other; means for comparing the phased series until coincidence between terms of residue value occurs; means for counting the number of terms at which coincidence occurs; and means for compiling the values of said coinciding residue value and the count of said number of terms to obtain the product of all of the entries.

2. A system of computation comprising, means for representing entries by characteristic series formed by repeating cycles of terms, means for phasing and synchronizing the cycles with respect to a starting point, means for comparing the phased series until coincidence between terms of residue value occurs, means for counting the number of terms at which coincidence occurs, and means for compiling the values of said coinciding residue value and the count of said number of terms to obtain the product of all of the entries, said entries being quantities reduced to factors which are prime with respect to each other.

3. The system of claim 2 wherein each of said repeating cycles is obtained by separating the represented entry into modulo and residue portions, sequentially adding the entry followed by subtraction of a basal value, to a preceding term of the series to obtain succeeding terms; continuing the addition and subtraction until a term value is obtained which exceeds the base value; then subtracting only the base value to obtain the last term of the cycle.

4. The system of claim 3 wherein the cycles are phased in accordance with the modulo portions of entries.

5. A system of computation comprising, means for representing entries by characteristics series formed by repeating cycles of terms, means for phasing and synchronizing the cycles with respect to a starting point, means for comparing the phased series until coincidence between terms of residue value occurs, means for counting the number of terms at which coincidence occurs, and means for compiling the values of said coinciding residue value and the count of said number of terms to obtain the product of all of the entries, said entries having modulo portions and said cycles being phased in accordance with the modulo portions.

6. A system of computation comprising, series producing means responsive to reception of a plurality of entry quantities for selecting cyclically repeating series of terms; phasing means responsive to reception of said entry quantities for cycle phasing of the series with respect to each other, registering means responsive to matching terms in all of said series, counter means for counting the number of operations of the series producing means before matching occurs and answer means operatively connected to the registering means and counter means for providing the product of all of the entry qauntities.

7. The combination of claim 6, wherein said series producing means comprises means for separating entry quantities into modulo and residue portions, means for performing a plurality of sequential operations including the addition of the entry quantity to the residue portion and subtraction of a base number from the sum to obtain the next term of the series, and means to prevent subtraction of the base number when the series term value exceeds a base value and when matching of all series terms occurs.

8. A system of computation comprising, series producing means responsive to reception of entry quantities for selecting cyclically repeating series of terms, phasing means responsive to reception of said entry quantities for cycle phasing of the series with respect to a starting point, registering means responsive to matching terms in at least two of said series, counter means for counting the number of operations of the series producing means before matching occurs, answer means operatively connected to the registering means and the counter means for providing the product of the entry quantities, and means for reducing the entry quantities to factors which are prime with respect to each other.

9. A computation control system having a control circuit comprising a source of signal medium, programming means operatively connected to said source for selectively directing the medium, input means operatively connected to the programming means for positioning thereof to an entry position, actuating mechanism operatively connected to the programming means for sequential movement thereof from its entry position, control means operatively connected to the programming means and actuating mechanism and responsive to an output signal as directed by the programming means to sequentially reposition the programming means by different amounts dependent on the entry position, counter means operatively connected to the programming means and input means for controlling the initial supply of signal medium to the control means and counting the number of output signals and stoppage means operatively connected to the programming means for cutting off the source of signal medium in response to one of the output signals.

10. The combination of claim 9, including a plurality of simultaneously operating control circuits, said one of the output signals occurring when the simultaneous output signals from each of the control circuits is identical.

11. The combination of claim 10, wherein said programming means comprises relatively movable apertured element initially positioned by the input means to expose one fluid connection to the control means and subsequently re-positioned by the actuating mechanism to expose other fluid connections and cyclically re-expose said one fluid connection.

12. The combination of claim 11 wherein said counter means includes a predetermination counter operative to control exposure of said fluid connection.

13. The combination of claim 12, wherein said actuating mechanism includes interconnected modulo operating means and residue operating means operative to move the programming means by controlled amounts.

14. The combination of claim 13, wherein said control means includes modulo control means for sequentially and cyclically supplying output signals from the programming means to the modulo operating means and residue control means for controlling movements of the residue operating means in accordance with the repositioning of the programming means.

15. A computation system for determining the product of a plurality of entry quantities that are prime with respect to each other comprising, means for selection of cyclic series of terms beginning with first portions of each entry; means for displacing the first term of each series with respect to each other in accordance with the other portions of the entry quantities for matching the terms of each of the series; means for counting the number of basal units of the series up to where coincidence of all terms of residue value occurs and means for deriving the product of all entry quantities from the count and the coinciding term.

16. In a computation system for obtaining the product of a plurality of quantities that are prime with respect to each other, comprising, means for reducing each quantity to a form represented by $MB+Ri$ where B equals a common basal unit value, M equals the integer number of basal units in the quantity and R equals the residue portion of the quantity of a value less than B, means for generating characteristic signals with respect to said quantities that are phased with respect to each other in proportion to the values of M and modulated in frequency and amplitude in proportion to both the values of M and $Ri$ associated with the respective quantities, means for terminating said characteristic signals in response to amplitude coincidence of all of said signals, and means for measuring the duration of said signals and the terminal amplitude thereof to obtain the product in terms of $NB+Ro$, where N represents the duration of said signals in terms of an integer number of basal units and $Ro$ represents the terminal amplitude.

17. In a computation system, means for converting a plurality of entries into modulo and residue portions, means for generating a plurality of signals phased with respect to each other in proportion to the modulo portions of the respective entries, means operative to simultaneously modulate said signals in frequency and amplitude in accordance with said modulo and residue portions of the respective entries, means responsive to coincidence in amplitude of said signals to stop generation thereof at the coinciding amplitudes, and means responsive to the duration of said signals and the coinciding amplitudes thereof for indicating the product of said entries.

18. Apparatus for coding an entry quantity by generation of an unending series of terms comprising, means for supplying two signals representative of a modulo portion of said entry quantity and a residue portion less than a predetermined basal unit, means for developing output signals representative of said terms of the unending series beginning with the residue portion and differing from each other by a constant amount representative of said residue portion, means responsive to development of those output signals representative of terms exceeding the basal unit in value for initiating a cycle of terms beginning with the excess over the basal unit, means responsive to said output signals for counting the terms corresponding thereto, means responsive to said supplied signal representative of the modulo portion for spacing said output signals and read-out means for stopping said output signal developing means in response to detection of any one of said output signals representative of a final term less in value than said basal unit to record the final term and the count corresponding thereto.

19. Apparatus for coding an entry quantity by generation of an unending series of terms comprising, means for supplying two signals representative of a modulo portion of said entry quantity and a residue portion less than a predetermined basal unit, means responsive to said supplied signal representative of the residue portion for developing a series of output signals representative of the successive addition of the residue portion to itself, means responsive to those output signals representative of a value in excess of said basal unit for starting another series of output signals representative of the successive addition of the entry residue portion to said excess value, phasing means responsive to said supplied signal representative of the entry modulo portion for spacing the output signals in proportion to the modulo portion, and phase shift means responsive to development of those output signals representative of said excess values for shifting the spacing of a following output signal by an amount proportional to one basal unit.

References Cited in the file of this patent
UNITED STATES PATENTS

| | | |
|---|---|---|
| 2,970,765 | Bird | Feb. 7, 1961 |
| 3,001,706 | Trussell | Sept. 26, 1961 |
| 3,045,913 | Hallden et al. | July 24, 1962 |